United States Patent [19]
Süssmann

[11] 3,926,715
[45] Dec. 16, 1975

[54] METHOD OF EPITACTIC PRECIPITATION OF INORGANIC MATERIAL

[75] Inventor: Erhard Süssmann, Poing, Germany

[73] Assignee: Siemens Aktiengesellschaft, Berlin and Munich, Germany

[22] Filed: Jan. 21, 1974

[21] Appl. No.: 435,084

Related U.S. Application Data

[63] Continuation of Ser. No. 219,880, Jan. 21, 1972, abandoned, which is a continuation of Ser. No. 848,971, Aug. 11, 1969, abandoned.

[30] Foreign Application Priority Data

Aug. 14, 1968 Germany.......................... 1769968

[52] U.S. Cl. ................ 156/612; 156/613; 156/614; 427/86; 427/93; 427/314; 427/399
[51] Int. Cl.² ........................ B01D 9/00; B01D 7/02
[58] Field of Search................ 117/201, 106 A, 213; 427/86, 314, 377, 399, 255, 93; 156/612, 613, 614

[56] References Cited

UNITED STATES PATENTS

| | | | |
|---|---|---|---|
| 3,222,217 | 12/1965 | Gradmaier.......................... | 117/213 |
| 3,386,857 | 6/1968 | Steinmaier.......................... | 117/212 |

*Primary Examiner*—Michael F. Esposito
*Attorney, Agent, or Firm*—Herbert L. Lerner

[57] ABSTRACT

A method for epitactic precipitation of inorganic material, especially silicon, on the purified surface of a silicon crystal. The method is so characterized that the surface to be coated is first oxidized and the resultant oxide layer is again, removed completely, through annealing in hydrogen or in a noble gas. Epitactic precipitation is then effected on the, thus exposed silicon surface, without contacting the silicon surface, purified by annealing, with an oxidized medium, for example air. The process reduces dislocation density.

4 Claims, 1 Drawing Figure

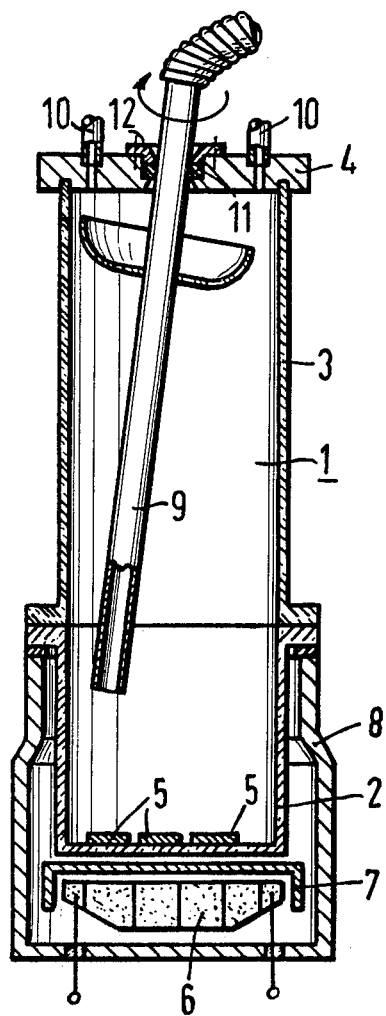

METHOD OF EPITACTIC PRECIPITATION OF INORGANIC MATERIAL

This is a continuation of application Ser. No. 219,880, filed Jan. 21, 1972, now abandoned, which in turn is a continuation of application Ser. No. 848,971, filed Aug. 11, 1969, now abandoned.

The method of epitactic precipitation of inorganic material upon the surface of a silicon crystal is one of the processes most commonly used for producing semiconductor devices. This method primarily precipitates a monocrystalline silicon layer upon the surface of a wafer-shaped silicon monocrystal. Since the quality of the silicon layers, preferably precipitated from a reaction gas or through vapor deposition, depends on the condition of the surface of the substrate crystal, it is necessary in the interest of obtaining the best possible crystal quality to carefully clean the substrate surface and to remove dislocations from the surface. Meanwhile it was found that for precipitating materials, other than silicon, a substrate surface, which is purified to the highest degree, is desirable. This applies, for example to the precipitation of $SiO_2$ or $Si_3N_4$ layers, which are known to be of considerable importance not only as to their use as diffusion masks, but also as protective masks for the finished semiconductor components.

It is customary during the preparation of the semiconductor wafers, to etch the name with etchant, containing hydrofluoric acid. In lieu thereof, it is also possible to etch with a gas, which has etching properties, such as HCl, $SiCl_4$ and $SiHCl_3$. Finally, it was customary during the coating of silicon rods, to anneal the same, prior to the passage of the reaction gas, in highly pure hydrogen.

The present invention relates to a method for epitactic precipitation of inorganic material, especially silicon, on the purified surface of a silicon crystal. The method is so characterized that the surface to be coated is first oxidized and the resultant oxide layer is again removed completely, through annealing in hydrogen or in a noble gas. Epitactic precipitation is then effected on the thus exposed silicon surface, without contacting the silicon surface, purified by annealing, with an oxidized medium, for example air.

The performance of the method of the invention is disclosed in greater detail in a drawing which illustrates an appropriate device in which the process is performed.

A silicon crystal 5, to be coated, is located on the bottom of a quartz reactor 1, whose lower part 2 can be separated from the upper part 3 for the purpose of charging the apparatus with the silicon wafers 5. The upper part contains the gas inlet 9 and the gas outlet 10. As seen through arrow 11, the gas inlet 9 can be rotated within the seal 12. Heating of the silicon wafers 5, which are to be coated, takes place by means of an electric heater 6, arranged below the bottom 2 of the reaction vessel 1. The heater supplies the heat necessary for reaction to the wafers 5 to be coated via a temperature adjusting plate 7. The heating device, as well as the lower part 2 of the reaction container 1, are situated in a heating sleeve or pot 8.

In order to carry out the method of the invention, the apparatus, after insertion of wafers 5, is heated so that the wafers are maintained at a temperature of 1000°–1280°C. During this time, oxidized gas, such as pure oxygen or an oxygen-containing inert gas, such as $N_2$, He or Ar, or oxygen-containing hydrogen, flows through the apparatus. The processing period preferably lasts about 2 minutes. An oxide layer having a thickness of between 20 and 100 A is thus formed.

After the wafer surface is oxidized, pure hydrogen and/or argon is substituted for the oxidizing gas. The wafers 5 continue to be maintained at annealing temperature (1000° to 1280°C) and thereby lose their oxide layer. This happens because of a reaction between the $SiO_2$ and the excess silicon, to form volatile silicon monoxide. The duration depends upon the layer thickness. Oxide layers which are between 10 and 100 A thick are completely removed, at a processing temperature of 1000° to 1280°C, within 5 to 20 minutes. This also completely removes the impurities which were previously present at the semiconductor surface, as well as dislocations, so that we obtain a perfect surface for the substrate wafers 5, suitable for epitactic coating.

The invention further proceeds by directly substituting the reaction gas, required for epitactic precipitation, for the gas (hydrogen or noble gas) used during annealing. The epitactic process itself is effected in a known manner so that detailed explanation thereof is not necessary within the framework of the present application.

I claim:

1. A method of epitactic precipitation of a silicon layer on the surface of a wafer of silicon monocrystal from which surface impurities and dislocations have been removed, which consists sequentially in oxidizing the surface of said silicon monocrystal having surface impurities and dislocations, for a time to produce from the silicon in said surface a $SiO_2$ layer sufficient to encompass said surface impurities and dislocations of from about 10 A thick on the surface of the silicon monocrystal wafer, removing completely the resultant $SiO_2$ layer by annealing said silicon wafer in hydrogen or inert gas thereby producing a surface on the silicon monocrystal free of surface impurities and dislocations, thereafter subjecting said newly produced silicon surface out of contact with an oxidizing medium to epitactic precipitation by a reaction gas which effects the epitactic precipitation on said surface free of surface impurities and dislocations.

2. The method of claim 1 in which said annealing is for a period of 50 to 20 minutes.

3. The method of claim 1 wherein said oxidation is effected by treatment with an oxidizing gas for a period of about 2 minutes at a temperature between 1000° and 1280°C, and wherein the removing of said resultant $SiO_2$ layer by said annealing is at a temperature between 1000° and 1280°C.

4. The method of claim 1, wherein the oxide layer is from about 10 to 100 A thick.

* * * * *